No. 840,193. PATENTED JAN. 1, 1907.
G. W. BARLOW.
DEVICE FOR OPERATING BRAKES AND BRAKE RODS.
APPLICATION FILED MAY 24, 1906.
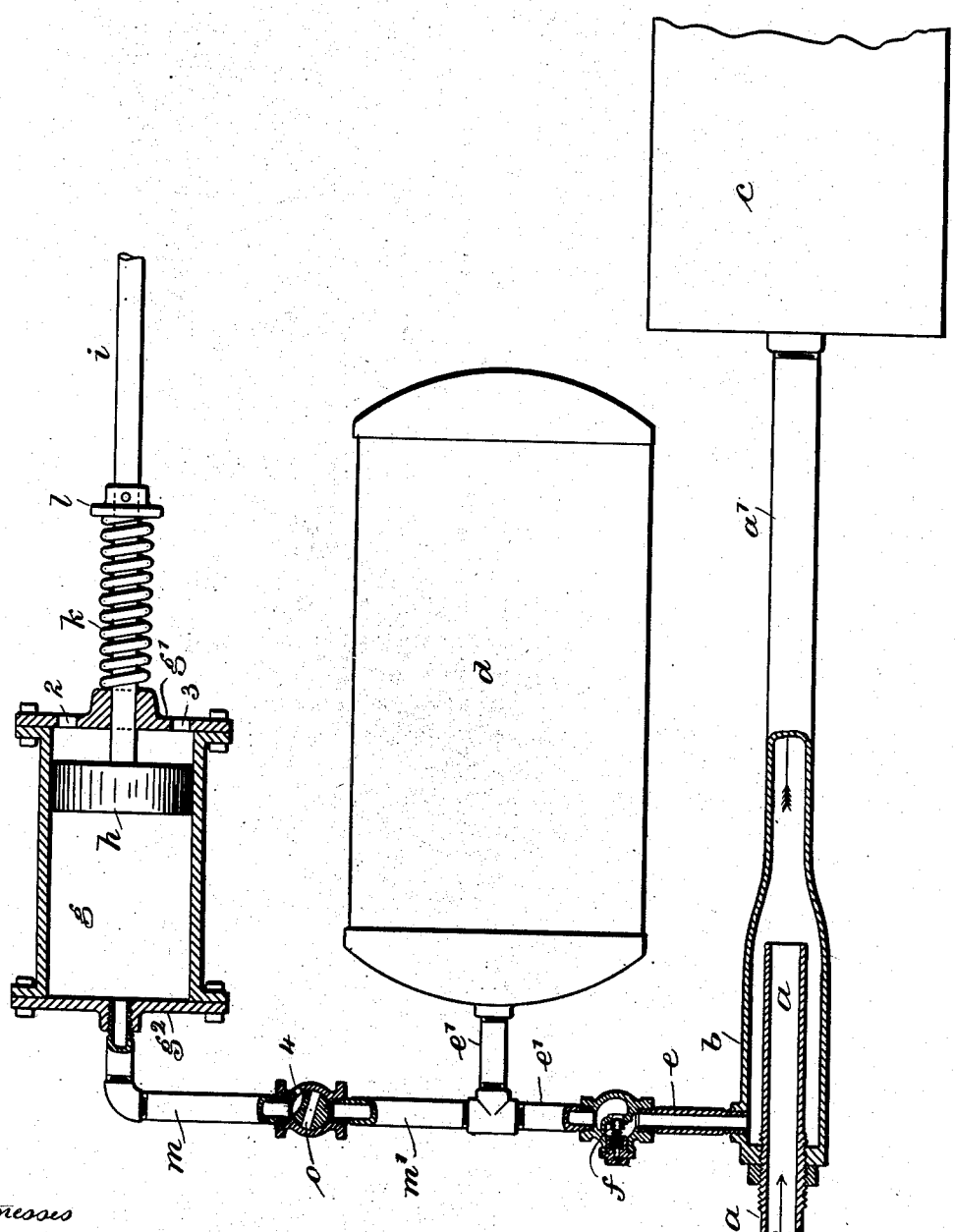

UNITED STATES PATENT OFFICE.

GEORGE W. BARLOW, OF SHREWSBURY, NEW JERSEY.

DEVICE FOR OPERATING BRAKES AND BRAKE-RODS.

No. 840,193.	Specification of Letters Patent.	Patented Jan. 1, 1907.

Application filed May 24, 1906. Serial No. 318,437.

*To all whom it may concern:*

Be it known that I, GEORGE W. BARLOW, a citizen of the United States, residing at Shrewsbury, in the county of Monmouth and State of New Jersey, have invented a new and useful Improvement in Devices for Operating Brakes and Brake-Rods, of which the following is a specification.

My invention relates to devices for operating brakes and brake-rods applied to any form of vehicle, but especially to a vehicle of the automobile type; and the object of my invention is to utilize the exhaust of the engine on the way to the muffler or discharge as a means by the operation of which the brakes of such a vehicle may be actuated and applied with power to arrest its movement.

In carrying out my invention the movement and force of the exhaust of the motor-engine on its way to the discharge or to the muffler is passed through an ejector and employed to produce, to as great an extent as possible, a vacuum in a suitable tank to which the ejector is connected by a pipe, in the line of which is interposed a check-valve against intermittent back pressure.

I employ a cylinder for the piston of a brake-rod which is adapted to actuate a suitable brake device, there being around the said rod between one cylinder-head and a collar a helical spring adapted to return the piston and rod to an initial position. This cylinder is actuated by a communicating pipe with a vacuum-chamber, and in the line of pipe is interposed a two-way valve.

The details of the construction and the operation are hereinafter more particularly described.

In the drawing I have represented my invention by a diagrammatic elevation and section.

*a* represents a pipe from an engine by means of which the exhaust of the motor-engine is discharged.

*b* is an ejector-body surrounding a portion of the pipe *a* and reduced at one end and prolonged, as a pipe *a'*, which forms a substantial continuation of the pipe *a*, and *c* represents a muffler or discharge to which the pipe *a'* is connected.

*d* represents a vacuum-cylinder, and *e e'* pipes extending from the ejector-body *b* to communication with the vacuum-tank *d*, and interposed between the pipes *e e'* is a check-valve *f*, so placed as to close against intermittent back pressure.

*g* is a cylinder with cylinder-heads *g' g²*. A piston *h* is movable within the cylinder, and a brake-rod *i*, passing through the cylinder-head *g'*, connects with the piston *h*. This cylinder-head *g'* is provided with a series of holes 2 3, opening up communication of the atmosphere within the cylinder against one face of the piston *h*.

Surrounding the brake-rod *i* and between the center of the cylinder-head *g'* and a collar *l*, pinned to the brake-rod, is a helical spring *k*, the office of which is to project the brake-rod and to draw the piston *h* toward the cylinder-head *g'*.

Connected with the cylinder-head *g²* is a pipe *m*. To the other end of this pipe is secured a two-way valve *o*, and a pipe *m'* extends from the valve *o* to connection with the coupling of the pipe *e'*.

In the position of the parts shown in the drawing the piston *h*, the brake-rod *i*, and the spring *k* are represented in an initial position, the two-way valve *o* being turned so that the opening 4 therein permits the entrance of air through the pipe *m* to the opposite side of the piston *h*, so that the pressure of air is equal on both sides of the piston, in which position the expansive action of the spring *k* operates to return the parts to the initial position shown in the drawing.

The exhaust from the motor-engine, whether of steam or hot gases, passing through the pipe *a* on its way to the muffler or to the discharge creates a partial vacuum in the ejector-body *b* and pipe *e*, opening the valve *f*, and drawing the air through the pipes *e'* and from the tank *d*. This exhaust usually comes in pulsations, and its action is therefore intermittent rather than constant, so that between the pulsations it is possible, if they are not too rapid, for the check-valve *f* to close against back pressure which might be in the pipe *a'* and body *b* of the ejector. A very appreciable vacuum is thus effected and maintained in the tank *d*. When the valve *o* is turned so that the passage-way transversely thereof alines with the openings in the pipes *m m'*, connecting the tank *d* with the cylinder *g*, the vacuum therein at once acts upon the air in the cylinder *g* and pipes *m m'* to draw the same out of the cylinder and produce a partial vacuum, permitting the atmospheric pressure through the openings 2 3 to act upon the piston *h*, moving the same through the cylinder, drawing along the brake-rod *i*, and applying the brake device and at the same time compressing the spring $k$. The brake device may not only be thus applied, but be held as applied for any reasonable or desirable period. At the same time the operation of the ejector device is constantly increasing the vacuum in the tank $d$. When it is desired to release the brake device, the two-way valve $o$ is turned by any suitable mechanism into the position shown in the drawing, thereby closing off communication between the pipes $m$ and $m'$ and opening up communication between the pipe $m$ and the atmosphere through the opening 4 in the cylindrical case of the valve $o$, thereby admitting the air through the pipe $m$ to the cylinder $g$, so as to balance the air-pressure upon both sides of the piston $h$ and permit the spring $k$ by its expansion to move the piston $h$ along through the cylinder and project the rod so as to loosen the brake device on its hold wherever employed. In this latter position and as hereinbefore stated the exhaust keeps right along, acting to produce the vacuum in the tank $d$, and at any time that the motor-engine stops the check-valve $f$ at once seats and holds the vacuum.

While the device of my improvement is especially adapted for the operation of brake devices of vehicles, I do not limit myself to such application, as the piston $h$ and the rod $i$ may be the medium of effecting the operation of some other devices.

I claim as my invention—

1. The combination with an exhaust-pipe from a motor-engine, an ejector and a discharge-pipe therefrom, of a vacuum-tank, a pipe extending therefrom to the said ejector, a check-valve interposed in said line of pipe, a pipe from said vacuum-tank and a valve in the line of pipe, a longitudinally-movable rod and devices interposed between the same and the latter pipe for moving said rod in opposite directions.

2. The combination with an exhaust-pipe from a motor-engine, an ejector and a discharge-pipe therefrom, of a vacuum-tank, a pipe extending therefrom to the said ejector, a check-valve interposed in said line of pipe, a pipe from said vacuum-tank and a valve in the line of pipe, a cylinder connected with said pipe, a piston longitudinally movable in said cylinder, a brake-rod passing through one cylinder-head and connected to said piston, and means for automatically returning said piston and rod to an initial position.

3. The combination with an exhaust-pipe from a motor-engine, an ejector and a discharge-pipe therefrom, of a vacuum-tank, a pipe extending therefrom to the said ejector, a check-valve interposed in said line of pipe, a pipe from said vacuum-tank and a valve in the line of pipe, a cylinder connected with said pipe, a piston longitudinally movable in said cylinder, a brake-rod passing through one cylinder-head and connected to said piston, a helical spring surrounding said rod outside of said cylinder, a collar secured to said rod beyond said spring, the adjacent cylindrical head being provided with a series of perforations.

4. The combination with an exhaust-pipe from a motor-engine, a muffler, and an interposed ejector, of a vacuum-tank, pipes connecting the ejector and vacuum-tank, a back-pressure check-valve inserted in said line of pipe, a pipe extending from the vacuum-tank and a two-way valve having a perforation for the admission of air in its case interposed in said latter line of pipe, a longitudinally-movable rod and interposed devices between the same and the said line of pipe for moving said rod in opposite directions.

5. The combination with an exhaust-pipe from a motor-engine, a muffler, and an interposed ejector, of a vacuum-tank, pipes connecting the ejector and vacuum-tank, a back-pressure check-valve inserted in said line of pipe, a pipe extending from the vacuum-tank and a two-way valve having a perforation for the admission of air in its case interposed in said latter line of pipe, a cylinder connected at one head with said latter line of pipe, the other head being provided with series of perforations for the admission of the atmosphere, a piston in said cylinder with said rod connected thereto and extending through the cylinder-head having the perforation, a collar fastened to said rod and a helical spring between the collar and the piston-head having the perforations.

Signed by me this 21st day of May, 1906.

G. W. BARLOW.

Witnesses:
GEO. T. PINCKNEY
E. ZACHARIASEN